US007835851B2

(12) United States Patent
Teramoto et al.

(10) Patent No.: US 7,835,851 B2
(45) Date of Patent: Nov. 16, 2010

(54) FUEL INJECTION SYSTEM

(75) Inventors: Takafumi Teramoto, Osaka (JP);
Takashi Miyamoto, Osaka (JP);
Kazuhiro Yamada, Osaka (JP); Rio Takahashi, Osaka (JP); Hidenori Nomura, Osaka (JP); Yasurou Kimura, Osaka (JP)

(73) Assignee: Yanmar Co., Ltd., Osaka-shi, Osaka (JP)

( * ) Notice: Subject to any disclaimer, the term of this patent is extended or adjusted under 35 U.S.C. 154(b) by 497 days.

(21) Appl. No.: 11/908,654

(22) PCT Filed: Nov. 10, 2005

(86) PCT No.: PCT/JP2005/020642

§ 371 (c)(1),
(2), (4) Date: Nov. 20, 2007

(87) PCT Pub. No.: WO2006/098058

PCT Pub. Date: Sep. 21, 2006

(65) Prior Publication Data

US 2008/0264381 A1    Oct. 30, 2008

(30) Foreign Application Priority Data

Mar. 16, 2005  (JP)  ............... 2005-076139
Mar. 16, 2005  (JP)  ............... 2005-076143
Mar. 16, 2005  (JP)  ............... 2005-076146

(51) Int. Cl.
*B60T 7/12*  (2006.01)
*G06F 19/00*  (2006.01)

(52) U.S. Cl. ..................... 701/105; 701/112

(58) Field of Classification Search ............... 701/105, 701/103, 112, 114, 115; 123/445, 478, 480, 123/355
See application file for complete search history.

(56) References Cited

U.S. PATENT DOCUMENTS 3,943,902 A * 3/1976 Skinner ............... 123/502

(Continued)

FOREIGN PATENT DOCUMENTS

JP    62-067256    3/1987

(Continued)

OTHER PUBLICATIONS

International Search Report mailed on Dec. 27, 2005 for International Application No. PCT/JP2005/020642 filed on Nov. 10, 2005, 2 pgs.

*Primary Examiner*—John T Kwon
(74) *Attorney, Agent, or Firm*—Sterne, Kessler, Goldstein & Fox, P.L.L.C.

(57) ABSTRACT

There is well known that the more the timing of fuel injection is advanced, the more the start ability of an engine is improved. However, with regard to the conventional fuel injection system, when a stopping process of the engine is performed, a timer piston determining timing of fuel injection remains at a position at which the piston exists at the time that the stopping process is performed. Then, at the time of next starting of the engine, the timer piston does not often exist in the advanced angle side and the start ability may be poor. For solving this problem, an engine control module (ECM) 21 advances a timer piston 52 and stops fuel injection of a fuel injection pump 40 at the time that actual phase difference C reaches stopping target phase difference Z so as to stop an engine 20.

6 Claims, 10 Drawing Sheets

U.S. PATENT DOCUMENTS

| | | | | |
|---|---|---|---|---|
| 4,037,574 A | * | 7/1977 | Swift | 123/502 |
| 4,079,719 A | * | 3/1978 | Varcoe et al. | 123/502 |
| 4,337,512 A | * | 6/1982 | Furuhashi | 701/112 |
| 5,974,792 A | * | 11/1999 | Isobe | 60/278 |
| 6,763,799 B2 | * | 7/2004 | Ito et al. | 123/299 |
| 6,805,100 B2 | * | 10/2004 | Morita | 123/436 |
| 6,807,934 B2 | * | 10/2004 | Kataoka et al. | 123/179.4 |
| 2004/0144358 A1 | * | 7/2004 | Morita | 123/305 |
| 2004/0149247 A1 | * | 8/2004 | Kataoka et al. | 123/179.4 |

FOREIGN PATENT DOCUMENTS

| | | |
|---|---|---|
| JP | 04-292549 | 10/1992 |
| JP | 10-089193 | 4/1998 |
| JP | 2003-172188 | 6/2003 |
| JP | 2004-4218636 | 8/2004 |

* cited by examiner (a)

(b)

RT ; the case that intake rack position limit curve is selected
RM ; the case that rotation speed rack position limit curve is selected predetermined rotation speed=M8−M5

RT ; the case that intake rack position limit curve is selected
RM ; the case that rotation speed rack position limit curve is selected

FUEL INJECTION SYSTEM

TECHNICAL FIELD

The present invention relates to a fuel injection system. More particularly, the present invention relates to a fuel injection system which comprises a control means controlling timing of fuel injection to a cylinder of an engine and drivingly controls a rack adjusting fuel injection amount.

BACKGROUND ART

The conventional diesel engine is driven while the phase difference between the phase of a camshaft, which is the drive source of fuel injection of a fuel injection pump and determines timing of fuel injection, and the phase of a crankshaft of the engine is kept at a certain value.

By changing the phase difference forward or rearward following the state of the engine, the engine can be driven efficiently.

As a device changing phase of the camshaft of the fuel injection pump, there is well known a hydraulic timer unit. An example thereof is shown in below patent literature 1.

The hydraulic timer unit comprises a timer piston (it is also referred to as "shuttle piston") between a camshaft coupling fixed to the camshaft of the fuel injection pump and a pump driving gear to which rotation of the crankshaft is transmitted so as to change the phase angle of the shafts.

The timer piston spline-fits the outer peripheral surface of the camshaft coupling straightly, and a pump driving gear spline-fits the outer peripheral surface of the timer piston helically.

According to this construction, the phase difference between the camshaft coupling and the pump driving gear can be changed by sliding the timer piston along the spline direction of the camshaft coupling.

This slide of the timer piston is performed by oil pressure, and the oil pressure is controlled by an Engine Control Module (ECM) which controls the engine.

Accordingly, the ECM controls the timer piston to the advanced side or the retarded side following the state of the engine so as to make the timing of fuel injection pertinent.

Now, with regard to such a fuel injection system that is described above, an engine stopping process is performed for example that an operator performs a stopping operation with an operation part such as a key switch, and then the ECM stops fuel injection to the engine so as to stop the engine.

Conventionally, in this stopping process, the timer piston is stopped at a position at which the piston exists at the time that the operator performs the stopping operation or a position at which the piston exists at the time that fuel injection is stopped.

Namely, the timer piston remains at the position of normal driving of the engine.

The timer piston is generally controlled hydraulically, whereby the timer piston cannot be controlled at the time of starting the engine.

Accordingly, at the time of starting the engine, the timer piston still exists at the position at which the piston exists at the time that the stopping process is performed (that is, the above-mentioned position of normal driving of the engine).

However, it is generally known that the more the timing of fuel injection is advanced, the more the start ability of an engine is improved.

Accordingly, with regard to the conventional fuel injection system, the start ability at the time of starting the engine is not necessarily good, whereby actuation time of a starting motor is long so that the load applied on a battery is large.

There is conventionally known a fuel injection system which controls drivingly a fuel injection pump injecting fuel to a cylinder of a diesel engine, a hydraulic timer unit changing the phase of timing of fuel injection, a governor adjusting fuel injection amount, and the like.

An example of such a conventional fuel injection system is described in the patent literature 1.

With regard to such a fuel injection system, for example, position of a rack provided within a governor is generally controlled drivingly following engine rotation speed or manifold pressure of a supercharger (turbocharger). The relation thereof has been memorized previously in an ECM which is an example of a control means of the engine and the fuel injection system, and an example of the relation is shown in FIG. 6.

With regard to a graph in FIG. 6, the axis of abscissas shows "engine rotation speed" and "manifold pressure" of the supercharger and the axis of ordinates shows "rack position". The graph shows curves as described below.

With regard to the relation between manifold pressure of the supercharger and rack position, an intake rack position limit curve RT shows the relation between manifold pressure and rack position at which the fuel injection amount is maximized. So to speak, the curve is an upper limit line of the rack position.

With regard to the relation between engine rotation speed and rack position, a rotation speed rack position limit curve RM shows the relation between engine rotation speed and rack position at which the fuel injection amount is maximized. So to speak, the curve is an upper limit line of rack position.

With regard to the relation between engine rotation speed and rack position, a rotation speed rack position minimum curve RS shows the relation between engine rotation speed and rack position at which the fuel injection amount is minimized. So to speak, the curve is a lower limit line of rack position.

Though the intake rack position limit curve RT does not depend directly on engine rotation speed, the intake rack position limit curve RT and the rotation speed rack position limit curve RM may have the same rack position RC (point EC). Accordingly, based on the point EC, the intake rack position limit curve RT and the rotation speed rack position limit curve RM can be shown in one graph.

Namely, the intake rack position limit curve RT can be drawn as if the curve RT changes depending on engine rotation speed.

In addition, FIG. 6 shows an example of a fuel injection system of a ship or the like.

Now, conventionally, the ECM selects one of the intake rack position limit curve RT and the rotation speed rack position limit curve RM as the upper limit line of rack position as described below.

The ECM selects one of the lines, which makes the control range of rack position narrower, as the upper limit line.

For example, in the case that the engine idles and rotation speed is low, that is, in the case that engine rotation speed is M1 and manifold pressure is F1, the intake rack position limit curve RT, which makes the control range of rack position narrower than the rotation speed rack position limit curve RM, is selected as the upper limit line.

By this selection, the maximum fuel injection amount can be limited so as to suppress discharge of unburnt gas and black smoke.

Therefore, at the actual operation, the ECM selects the intake rack position limit curve RT as the upper limit line in the case that the engine rotation speed is between M1 and MC for example. On the other hand, the ECM selects the rotation speed rack position limit curve RM as the upper limit line in the case that the engine rotation speed is between MC and M2.

Namely, a curve passing through a point ET1, a point EC and a point EM2 is the upper limit line of rack position.

With regard to the above-mentioned fuel injection system, in the case that fuel injection amount is adjusted based on engine rotation speed, for example, maximum fuel injection amount and minimum fuel injection amount corresponding to engine rotation speed have been determined previously, and fuel injection amount is adjusted within this range. Namely, in this case, the relation between engine rotation speed and the maximum fuel injection amount and the relation between engine rotation speed and the minimum fuel injection amount have been memorized previously in the control means such as the ECM of the fuel injection system, and fuel injection amount is controlled based on these relations.

Now, in the case that engine rotation speed is lower than the predetermined minimum set rotation speed for improving engine failure-proof ability or another reason, there is a fuel injection system like the above mentioned controlling fuel injection amount to be increased following a decrease of the engine rotation speed. Namely, in the case that the engine rotation speed is the minimum set rotation speed, such as the case of idling, when load is applied on the engine by engaging a clutch or the like, the engine rotation speed may become lower than the minimum set rotation speed so as to cause engine failure. However, by increasing fuel injection amount following the fall of engine rotation speed at the lower rotation side than the minimum set rotation speed, the engine failure is prevented.

With regard to such a fuel injection system, the relation between engine rotation speed and fuel injection amount for increasing the fuel injection amount following the fall of the engine rotation speed at the lower rotation side than the minimum set rotation speed has been memorized in the control means corresponding to the certain predetermined minimum set rotation speed as mentioned above. Accordingly, when the minimum set rotation speed is changed, below defects may be caused.

The minimum set rotation speed is the minimum rotation speed of the range adjustable by operating a throttle or the like and is the engine rotation speed at the time of idling normally. Accordingly, for example in the case that the minimum set rotation speed is increased, when load is applied on the engine by engaging a clutch or the like at the time of idling, operability and driving feeling may be spoiled. The increase of fuel injection amount following the fall of engine rotation speed at the lower rotation side than the minimum set rotation speed is based on the relation between engine rotation speed and fuel injection amount determined corresponding to the certain minimum set rotation speed. Accordingly, in the case that the minimum set rotation speed is increased, the amount of fall of the engine rotation speed caused by applying the load may be increased and the fall of the engine rotation speed caused by applying the load may be not enough to increase fuel injection amount sufficiently. When such a phenomenon occurs, the recovery of fall of engine rotation speed by applying the load requires a measure of time, thereby spoiling operability and driving feeling.

To the contrary, in the case that the minimum set rotation speed is decreased, unnecessary fuel may be injected excessively so as to increase discharge of unburnt fuel.

Patent Literature 1: the Japanese Patent Laid Open Gazette 2004-218636

BRIEF SUMMARY OF THE INVENTION

Problems to be Solved by the Invention

The first purpose of the invention is to provide a fuel injection system which improves the start ability of an engine.

The second purpose of the invention is to provide a fuel injection system which prevents engine failure even if a load is applied at the time that the engine rotation speed is low such as the time of idling.

The third purpose of the invention is to provide a fuel injection system, constructed to increase the fuel injection amount following a fall of the engine rotation speed at lower rotation side than a minimum set rotation speed, which maintains engine failure-proof ability and prevents a fall of operability and driving feeling and an increase of discharge of unburnt fuel accompanied by a change of the minimum set rotation speed.

Means for Solving the Problems

The above-mentioned problems are solved by the following means.

According to the present invention, with regard to a fuel injection system comprising a control means controlling timing of fuel injection to a cylinder of an engine, the control means advances the timing of fuel injection so as to perform a stopping process of the engine when the stopping process is required.

Accordingly, at the time of stopping the engine, the timing of fuel injection is stopped at the advanced angle side at which the start ability of the engine is improved. Accordingly, the start ability is improved at the time of starting the engine next so as to make starting time of a starting motor shorter than the conventional construction, thereby reducing load on a battery.

The timing of fuel injection is changed by a timer piston.

Accordingly, the conventional timer piston can be used so as to reduce cost.

The control means controls phase difference between a crankshaft of the engine and the timing of fuel injection to be not less than a predetermined phase difference in the case of advancing the timing of fuel injection.

Accordingly, the phase difference at which the start ability is improved can be set in the control means concretely.

The control means performs the stopping process without advancing the timing of the fuel injection in the case of stopping the engine in an emergency.

Accordingly, at the time that the emergency stopping of the engine is required because of abnormality of the engine or the like, the timing of fuel injection is not advanced, whereby the engine can be stopped emergently.

Furthermore, according to the present invention, with regard to a fuel injection system comprising a rack which adjusts the fuel injection amount of a fuel injection pump injecting fuel to an engine, and a control means which controls the rack based on an intake rack position limit curve determining relation between intake pressure of a supercharger and a rack position maximizing fuel injection amount or a rotation speed rack position limit curve determining relation between engine rotation speed and the rack position maximizing fuel injection amount, the control means has a curve selection means selecting one of the intake rack position limit curve and the rotation speed rack position limit curve which makes the control range of the rack position wider when engine rotation speed falls for not less than a predetermined rotation speed from a target rotation speed.

Accordingly, one of the curves which makes the control range of the rack position wider is selected when the rotation speed of the engine falls for not less than the predetermined rotation speed from the target rotation speed, whereby the fuel injection amount is increased pertinently so as to prevent engine failure.

According to the present invention, with regard to a fuel injection system comprising a rack which adjusts the fuel injection amount of a fuel injection pump injecting fuel to an engine, and a control means which controls the rack based on an intake rack position limit curve determining relation between intake pressure of a supercharger and a rack position maximizing a fuel injection amount or a rotation speed rack position limit curve determining the relation between engine rotation speed and the rack position maximizing fuel injection amount, the control means has a curve selection means selecting one of the intake rack position limit curve and the rotation speed rack position limit curve which makes the control range of the rack position wider when elapsed time from starting the engine is within a predetermined range.

Accordingly, one of the curves which makes the control range of the rack position wider is selected within a range of a predetermined time from the starting of the engine, whereby a fuel injection amount is increased pertinently so as to prevent engine failure.

Furthermore, according to the present invention, with regard to a fuel injection system comprising a control means controlling a fuel injection amount of a fuel injection pump based on a lower rotation speed side fuel injection amount characteristic curve which determines the relation between engine rotation speed and fuel injection amount so that the fuel injection amount is increased following a fall of the engine rotation speed at a lower rotation side than changeable minimum set rotation speed, the control means increases and decreases engine rotation speed corresponding to fuel injection amount of the lower rotation speed side fuel injection amount characteristic curve following an increase and decrease of the minimum set rotation speed.

Accordingly, engine failure-proof ability is maintained and the fall of operability and driving feeling and an increase of discharge of unburnt fuel accompanied by the change of the minimum set rotation speed is prevented.

DETAILED DESCRIPTION OF THE INVENTION

Explanation will be given on the best mode for carrying out the present invention in connection with the accompanying drawings for understanding the present invention. In addition, the best mode for carrying out the present invention described below is a concrete example of the present invention and does not limit the technical extent of the present invention.

<Schematic Construction>

First, explanation will be given on the schematic construction of a fuel injection system 1 of the present invention according to FIG. 1.

Here, explanation will be given on a case that that the fuel injection system 1 is adopted as a control system of a fuel injection pump provided in a ship for example. However, the fuel injection system 1 may be adopted to anything which can obtain the same effect by this system.

Figure 1:
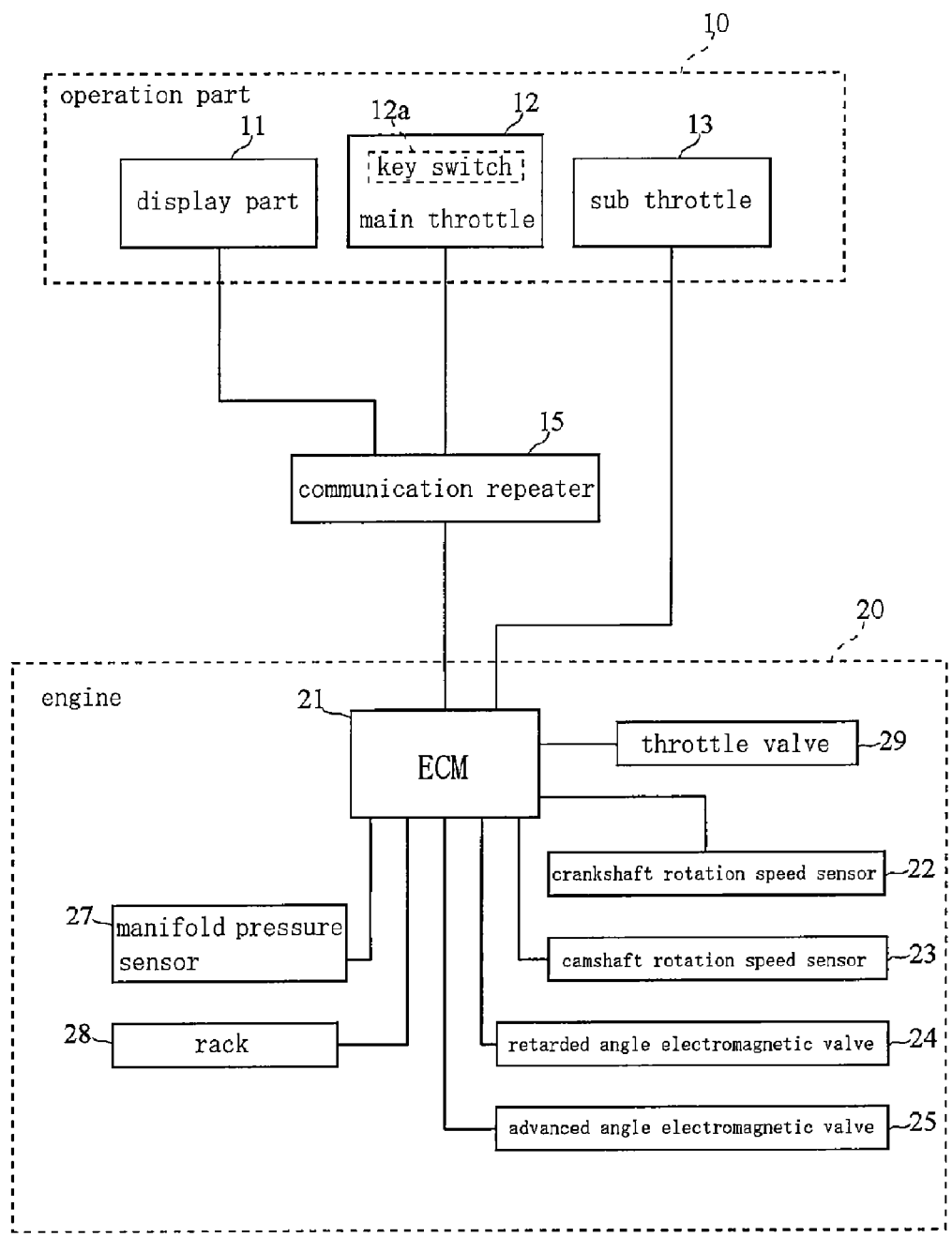
FIG. 1 is a block diagram of schematic construction of a fuel injection system.

As shown in FIG. 1, the fuel injection system 1 broadly comprises an operation part 10 and an engine 20.

The operation part 10 is provided in a driving cab of the ship and has a display part 11, a main throttle 12 and a sub throttle 13 for example.

The display part 11 displays the state of the ship to which the system is adopted, cautions, and the like, and may give caution with voice by providing a built-in speaker or the like.

The main throttle 12 is operated in the case that the ship is in normal driving state and operates a throttle valve 29 of the engine 20. For example, the main throttle 12 is operated via a lever.

A key switch 12a starting the engine 20 is provided in the operation part 10 integrally with or separately from the main throttle 12.

The sub throttle 13 operates the throttle valve 29 similarly to the main throttle 12. However, differently from the main throttle 12, the sub throttle 13 is operated in the case that the ship is not in normal driving state. For example, the sub throttle 13 is operated via a knob.

Each of the display part 11 and the main throttle 12 has an individual control part and communicates with an ECM (Engine Control Module) 21 so as to control the operation part 10 and the engine 20 entirely.

In addition, when the communication mode such as a protocol differs between the operation part 10 and the engine 20, a communication repeater 15 is provided as shown in FIG. 1 so as to coordinate the communication mode.

The sub throttle 13 is connected directly to the ECM 21 of the engine 20 and has the same communication mode as the engine 20.

The engine 20 is a diesel engine for example and comprises the ECM 21, a crankshaft rotation speed sensor 22, a camshaft rotation speed sensor 23, a retarded angle electromagnetic valve 24, an advanced angle electromagnetic valve 25, a manifold pressure sensor 27, a rack 28 and the like.

The ECM 21 controls actuators and the like in connection with the engine 20 based on the state of sensors in connection with the engine 20, the operation system such as the above-mentioned operation part 10, and the like.

The crankshaft rotation speed sensor 22 detects rotation speed of a crankshaft of the engine 20 and outputs the detected result as a crankshaft pulse to the ECM 21.

Namely, the rotation speed of the engine 20 can be detected by the crankshaft rotation speed sensor 22.

The camshaft rotation speed sensor 23 detects rotation speed of a camshaft of the engine 20 and outputs the detected result as a camshaft pulse to the ECM 21.

The crankshaft rotation speed sensor 22 and the camshaft rotation speed sensor 23 may be constructed by optical sensors. For example, by providing marks of prescribed numbers at prescribed intervals on the crankshaft and the camshaft or gears thereof previously at the time of manufacture, the ECM 21 can calculate the rotation speeds of the crankshaft and the camshaft 41 by detecting the marks by optical sensors.

Figure 2:
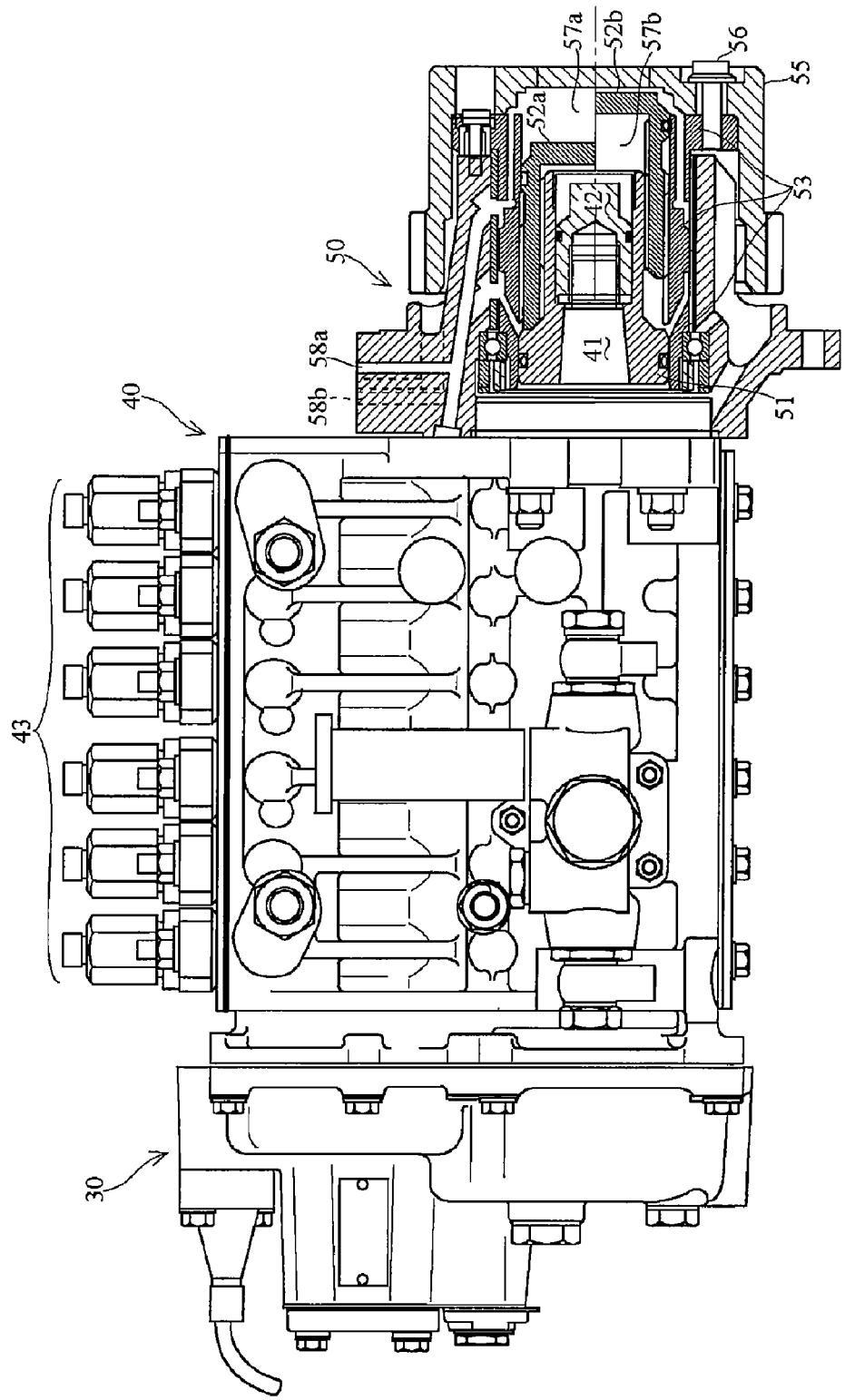
FIG. 2 is a drawing of a fuel injection pump and devices in connection therewith.

The retarded angle electromagnetic valve 24 and the advanced angle electromagnetic valve 25 are oil pressure regulating valves which controls oil pressure which slides a timer piston of a hydraulic timer unit, changing phase of a camshaft of a fuel injection pump 40 shown in FIG. 2, toward retarded or advanced side.

The manifold pressure sensor 27 detects manifold pressure of a supercharger provided on the engine 20.

The rack 28 adjusts the amount of fuel injected from the fuel injection pump 40.

<Fuel Injection Pump>

Next, explanation will be given on the schematic construction of the fuel injection pump 40 and devices in connection therewith according to FIG. 2.

In addition, a hydraulic timer unit 50 in FIG. 2 is shown in section.

Especially, a timer piston 52 is divided into upper and lower portions by an alternate long and short dash line for convenience. The piston at the retarded position is shown by a timer piston 52a, and the piston at the advanced position is shown by a timer piston 52b.

Of course, the actual timer piston 52 is not divided into two by the alternate long and short dash line and is formed integrally. In FIG. 2, the timer piston 52 is divided into two by the alternate long and short dash line so as to explain the movement of the timer piston 52.

The fuel injection pump 40 pressingly sends fuel stored in a fuel tank to an injection nozzle provided in a cylinder of the engine 20 and is driven by a camshaft 41. A coupling fixture 42 is fixed to the tip of the camshaft 41 so as to fix a camshaft coupling 51 to the camshaft 41.

Supply ports 43 of the same number as cylinders of the engine 20 are provided in the fuel injection pump 40 so as to supply fuel to the cylinders. FIG. 2 shows the case that six cylinders are provided.

Furthermore, a governor 30 and the hydraulic timer unit 50 are provided integrally with the fuel injection pump 40.

The governor 30 has the rack 28 and the rack 28 is driven by a proportional solenoid drivingly controlled by the ECM 21.

The timer piston 52, spline-fitting the outer peripheral surface of the camshaft coupling 51 straightly, is provided in the hydraulic timer unit 50. Moreover, a pump driving gear 53, spline-fitting the outer peripheral surface of the timer piston 52 helically, is provided in the hydraulic timer unit 50.

The pump driving gear 53 is fixed by a driven gear 55, receiving torque from the crankshaft of the engine 20, and a bolt 56.

According to the above-mentioned construction, the camshaft 41 can be rotated by the rotation of the crankshaft. Furthermore, by sliding the timer piston 52 along the spline direction of the camshaft coupling 51 (lateral direction in FIG. 2), the phase difference between the camshaft coupling 51 and the pump driving gear 53 can be changed.

In addition, as was previously mentioned, the helical shape of the spline fit is constructed so that the camshaft is retarded by sliding the timer piston 52 toward the side of the piston 52a, and is advanced by sliding the timer piston 52 toward the side of the piston 52b.

A space made at the outer peripheral side of the timer piston 52 fitting the pump driving gear 53 is referred to as a retarded angle chamber 57a, and a space made at the inner peripheral side of the timer piston 52 fitting the camshaft coupling 51 is referred to as an advanced angle chamber 57b.

In this case, the timer piston 52 can be slid toward the retarded angle side (the side of the piston 52a) by pressingly sending pressure oil to the retarded angle chamber 57a, and the timer piston 52 can be slid toward the advanced angle side (the side of the piston 52b) by pressingly sending pressure oil to the advanced angle chamber 57b.

The retarded angle electromagnetic valve 24 and the advanced angle electromagnetic valve 25 are disposed in each of a retarded angle oil passage 58a connected to the retarded angle chamber 57a and an advanced angle oil passage 58b connected to the advanced angle chamber 57b. The retarded angle electromagnetic valve 24 and the advanced angle electromagnetic valve 25 are controlled and operated by the ECM 21 so as to send pressure oil, thereby sliding the timer piston 52.

According to the above-mentioned construction, the ECM 21 functions as a control means controlling the timer piston 52 by hydraulic pressure according to the state of the engine 20 so that the phase difference between the crankshaft of the engine 20 and the camshaft 41 can be retarded or advanced freely.

<Actual Phase Difference>

As was previously mentioned, the marks have been provided on the crankshaft and the camshaft 41 or gears thereof previously and are detected by the crankshaft rotation speed sensor 22 and the camshaft rotation speed sensor 23. Based on the crankshaft pulse and the camshaft pulse which are the detected results, the ECM 21 calculates the rotation speeds of the crankshaft and the camshaft 41.

Accordingly, based on the difference between the detected times of the crankshaft pulse and the camshaft pulse, the ECM 21 also can calculate the phase difference between the crankshaft and the camshaft.

Then, explanation will be given on relation beyond the crankshaft pulse, the camshaft pulse and the actual timing of fuel injection according to FIG. 3.

Figure 3:
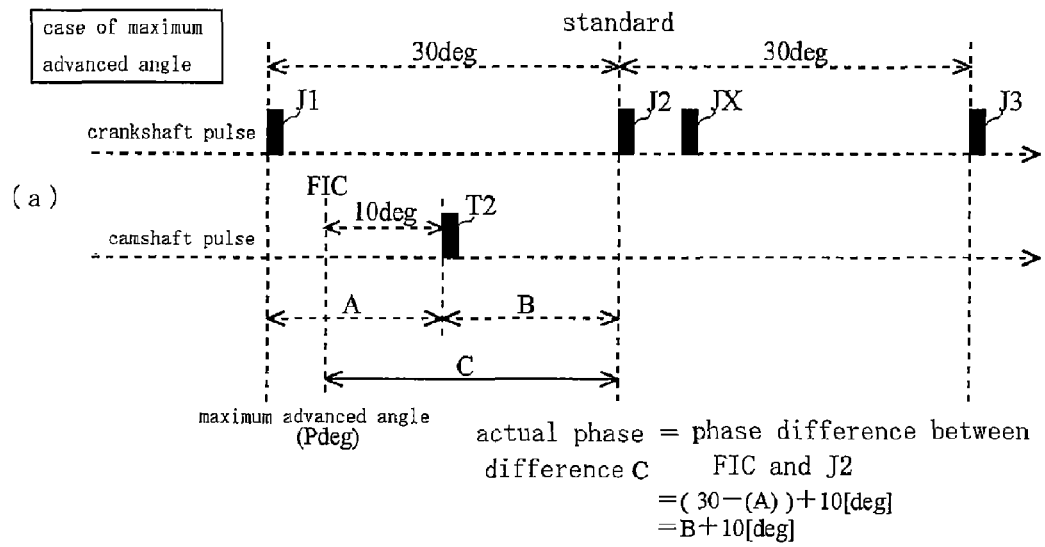
FIG. 3 is a diagram of relation beyond a crankshaft pulse, a camshaft pulse and a timing of fuel injection.
Figure 3:
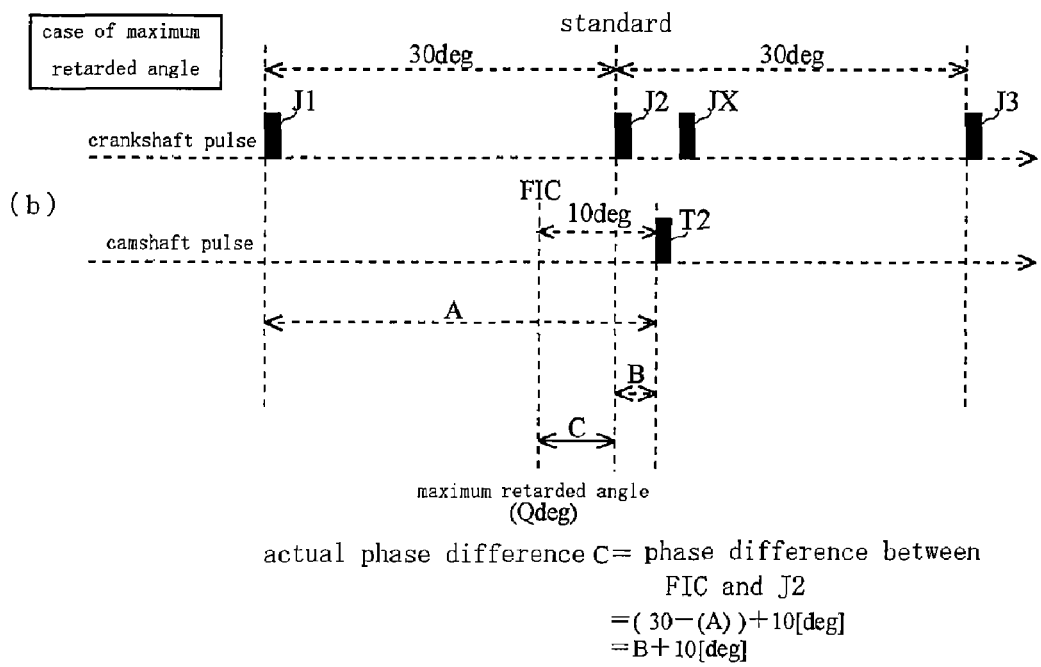

FIG. 3 shows the relation beyond crankshaft pulses J1, J2 and J3, the actual timing of fuel injection of certain supply port 43 (hereinafter, referred to as "FIC"), and a camshaft pulse T2 corresponding to the FIC.

In addition, FIG. 3 (a) shows the relation of the detection time of pulse (phase difference) in the case that the camshaft 41 is advanced against the crankshaft, and FIG. 3 (b) shows the relation of the detection time of pulse (phase difference) in the case that the camshaft 41 is retarded against the crankshaft.

As shown in FIG. 3, for example, the crankshaft pulses J1, J2 and J3 correspond to the marks provided on the crankshaft previously so as to be detected every 30 [deg].

The phase of the camshaft pulse T2 is obtained by calculating an angle B which is a phase difference against the crankshaft pulse J2 corresponding to the camshaft pulse T2.

Now, when the fuel injection is actually performed at the phase of the camshaft pulse T2, the angle B is the phase difference between the timing of fuel injection and the crankshaft. However, in the embodiment shown in FIG. 3, on the convenience of the design of the hydraulic timer unit 50, the fuel injection pump 40 and the like, the camshaft pulse T2 is not in agreement with the FIC and the FIC is shifted from the camshaft pulse T2 for 10 [deg] in angle.

Namely, the phase of the actual timing of fuel injection is earlier than the timing of detection of the camshaft pulse T2 for equivalent of the angle of 10 [deg] in time.

Then, in consideration of the above-mentioned gap of 10 [deg], the ECM 21 finally calculates the phase difference between the FIC and the crankshaft pulse J2 as "actual phase difference C".

Namely, the phase difference C is the phase difference between the timing of fuel injection, determined by the camshaft 41, and the crankshaft.

<Calculation of Actual Phase Difference C>

Next, explanation will be given on a method for calculating the actual phase difference C against the crankshaft pulse J2.

Firstly, the ECM 21 measures the time from the detection of the crankshaft pulse J1 just before the crankshaft pulse J2 to the detection of the camshaft pulse T2, and calculates the phase difference corresponding to the measured time as an angle A.

Then, the ECM 21 calculates the remainder of the angle of 30 [deg], which is the predetermined phase difference between the crankshaft pulse J1 and the crankshaft pulse J2, and the angle A as the angle B.

Namely, the calculation "(30−A)=B" is performed.

The angle B is the phase difference between the crankshaft pulse J2 and the camshaft pulse T2. Accordingly, the ECM 21 adds the predetermined phase difference between the camshaft pulse T2 and the FIC (the above-mentioned angle of 10 [deg]) to the angle B so as to calculate the actual phase difference C.

Namely, the calculation "B+10" is performed.

By performing the detection of the pulses and the calculation process as mentioned above, the actual phase difference C can be calculated.

In addition, the ECM 21 discriminates the crankshaft pulse J2 from the crankshaft pulse J1 by the way discussed below.

For example, a mark is provided close to the crankshaft pulse J2 at an interval not larger than 30 [deg] so as to detect a reset pulse JX.

By providing the mark corresponding to the reset pulse JX, when the ECM 21 detects two pulses at an interval smaller than 30 [deg] which is the angle of the interval between the crankshaft pulses, the first detected pulse can be recognized as the crankshaft pulse J2.

The ECM 21 changes the actual phase difference C, calculated as mentioned above, corresponding to the state of the engine 20 so as to determine the timing of fuel injection suitable to the state of the engine 20.

<Flow of Process>

Now, with regard to the conventional fuel injection system, when an operation stopping an engine is performed, a timer piston is stopped at a position at which the piston exists at the time that an operator performs the stopping operation.

Accordingly, at the time of starting the engine, the timer piston still exists at the position of the stopping operation. Therefore, the conventional fuel injection system is not necessarily excellent in start ability.

Figure 4:
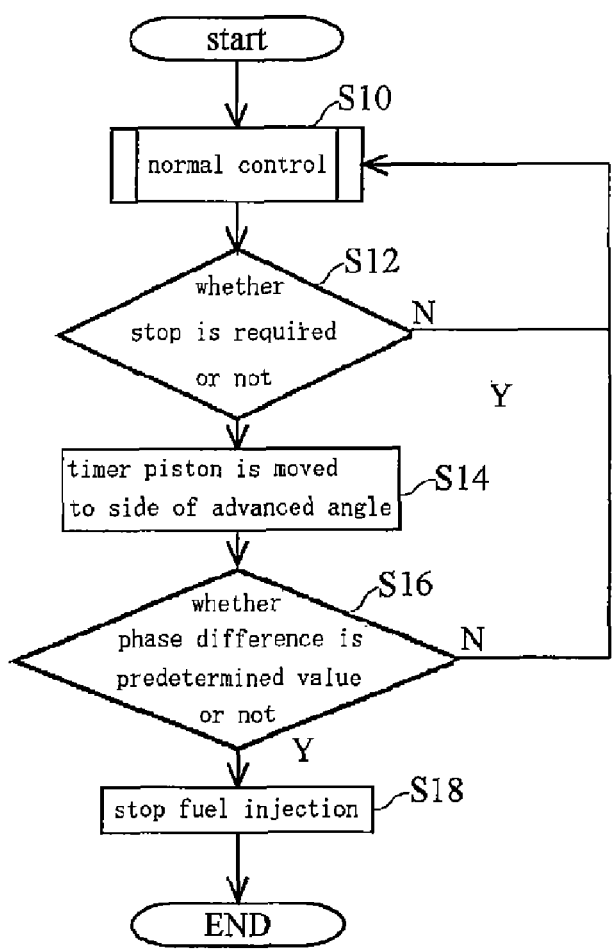
FIG. 4 is a flow chart of a course of process performed so as to stop an engine.

Then, explanation will be given on a course of process solving the above-mentioned problem according to a flow chart shown in FIG. 4.

Also, explanation will be given on an example of change of operation status of the key switch 12a, the actual phase difference C, the state of injection of fuel, the rotation speed of the engine 20 and the like in the stopping operation according to FIG. 5.

Figure 5:
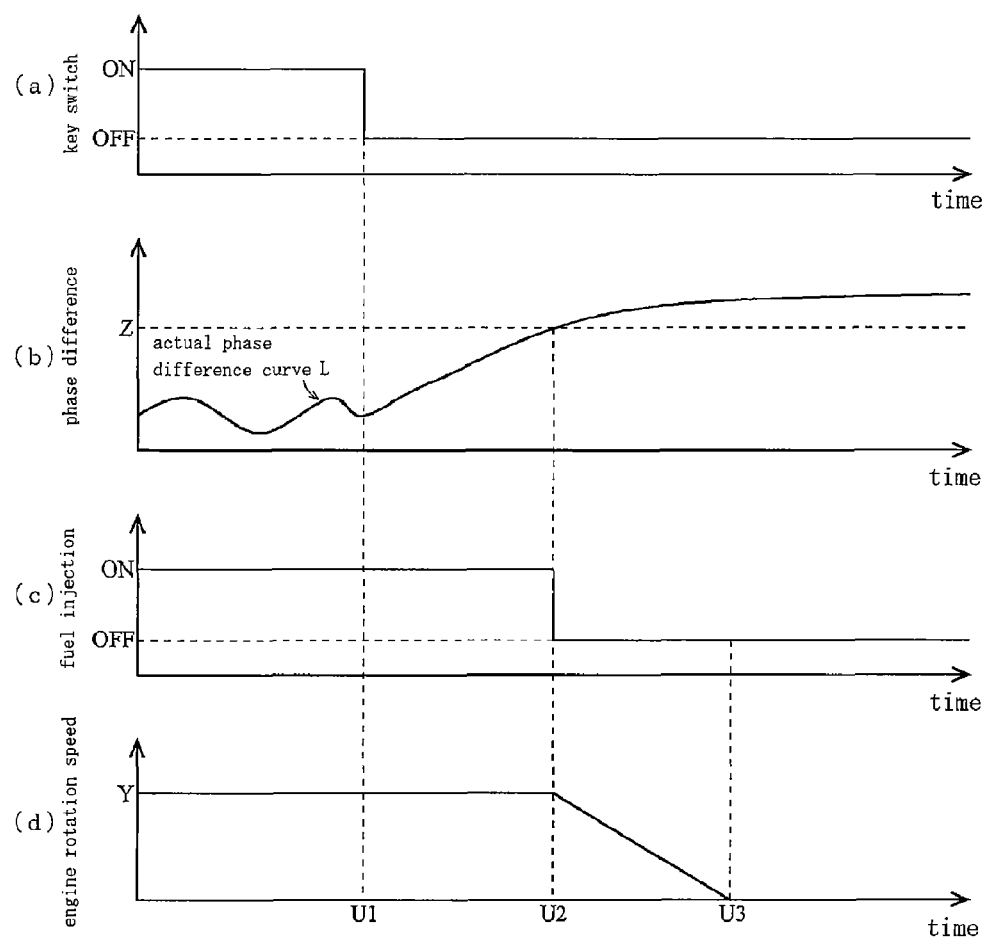
FIG. 5 is a diagram of relation beyond state of a key switch, actual phase difference, state of fuel injection and engine rotation speed.

In addition, FIG. 5 (a) shows the ON/OFF operation status of the key switch 12a. FIG. 5 (b) shows temporal change of the actual phase difference C as an actual phase difference curve L. FIG. 5 (c) shows the state of injection of fuel by the fuel injection pump 40. FIG. 5 (d) shows the rotation speed of the engine 20.

Firstly, the ECM 21 drives the engine 20 normally (S10).

At this time, each part of the fuel injection system 1 is in the state before time U1 in FIG. 5. The key switch 12a and the fuel injection are turned on, the actual phase difference C fluctuates slightly temporally, and the engine 20 is driven at rotation speed Y.

Next, the ECM 21 judges whether a request of the stopping process of the engine 20 exists or not (S12).

This process is performed by, for example, judging whether an operator turns the key switch 12a off so as to request the stopping process of the engine 20 or not.

When the request of the stopping process is judged to exist by this process, the process is shifted to a step S14. On the other hand, when the request of the stopping process is judged not to exist, the process of the step S12 is repeated.

When the request of the stopping process of the engine 20 exists, the ECM 21 makes the timer piston 52 move toward the advanced angle side (S14).

Namely, the ECM 21 advances the timing of fuel injection.

At this time, the actual phase difference C changes from the time U1 as shown in the actual phase difference curve L in FIG. 5 (b), and the value of the actual phase difference C becomes large gradually. Namely, the actual phase difference C is changed toward the advanced angle side.

Then, at time U2, the actual phase difference C reaches a predetermined phase difference at which the engine 20 is stopped (that is, stopping target phase difference Z).

The stopping target phase difference Z is an example of phase difference suitable to improve the start ability of the engine 20 and has been stored in the ECM 21 previously.

After the process of the step S14, the ECM 21 judges whether the actual phase difference C reaches the stopping target phase difference Z or not (S16).

Namely, the ECM 21 judges whether the actual phase difference C becomes not less than the stopping target phase difference Z or not.

Then, the ECM 21 stops the fuel injection to the cylinder of the engine 20 (S18).

This process can be performed, for example, by a way that the ECM 21 closes the rack 28, the electromagnetic valve in the fuel injection pump 40 or the fuel supply electromagnetic valve to the fuel injection pump 40.

By the process of the step S18, the stopping process of the engine 20 is performed.

For example, when the fuel injection is stopped at the time U2 as shown in FIG. 5, engine rotation speed begins to be reduced, and finally engine rotation speed becomes 0 and the engine is stopped at time U3.

By controlling as mentioned above, at the time of stopping the engine 20, the timing of fuel injection is stopped at the advanced angle side at which the start ability of the engine 20 is improved. Accordingly, the start ability is improved at the time of starting the engine 20 next so as to make starting time of a starting motor shorter than the conventional construction, thereby reducing load on a battery.

The ECM 21 controls the phase difference between the timing of fuel injection and the crankshaft of the engine 20 to be not less than the stopping target phase difference Z. Accordingly, the phase difference at which the start ability is improved can be set in the ECM 21 concretely.

<Case of Emergency Stopping of Engine 20>

The above-mentioned course of process (the process from the step S12 to the step S18) may be set not to be performed at the time that the emergency stopping of the engine 20 is required because of abnormality, such as breaking of wire or short circuit, of the engine 20, the hydraulic timer unit 50, the operation part 10, the communication repeater 15 or a connecting harness.

That is because the stopping needs a long time if the above-mentioned course of process is performed although the abnormality occurs and the emergency stopping is required.

Then, by processing as mentioned above, the engine 20 can be stopped emergently when the abnormality occurs.

<Engine Failure Preventing Process>

Figure 6:
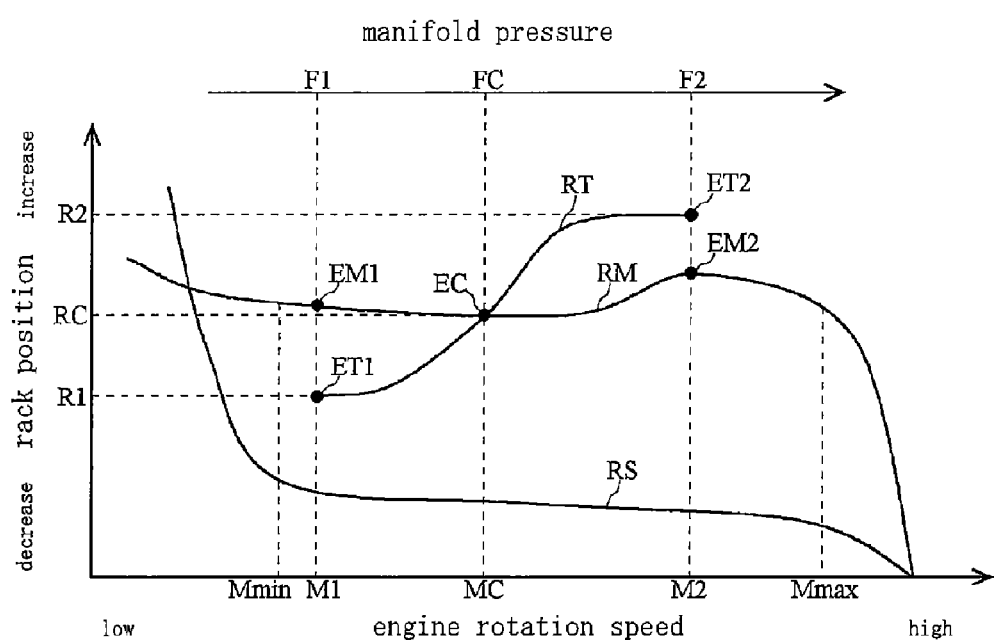
FIG. 6 is a diagram of relation beyond a rack position at which fuel injection amount is maximum or minimum, engine rotation speed and a supercharger.

Now, as explained according to FIG. 6 previously, the rack position at which the fuel injection amount becomes the maximum (upper limit line) is determined by an intake rack position limit curve RT or a rotation speed rack position limit curve RM previously memorized in the ECM 21.

Then, corresponding to rotation speed of the engine 20 and intake pressure of the supercharger, one of the curves are selected as the upper limit line so as to make the control range of the rack position narrower.

Accordingly, the maximum fuel injection amount is limited so that sudden decline of the engine rotation speed caused by applying a load or the like may not be dealt with, thereby causing engine failure.

Figure 7:
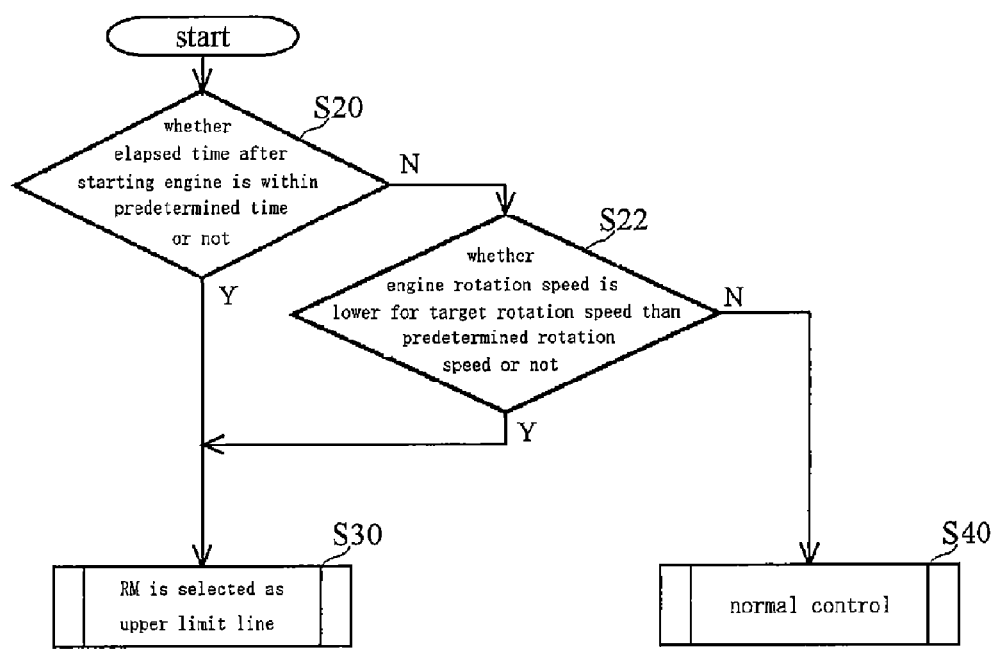
FIG. 7 is a flow chart of a course of process for preventing an engine failure.

Therefore, explanation will be given on a course of process preventing engine failure in such a case that mentioned above according to FIG. 7.

<Starting Engine>

First, when the engine 20 is started by operating the key switch 12a, the ECM 21 judges whether elapsed time after starting the engine 20 is within the range of predetermined time or not (S20).

The predetermined time has been memorized in the ECM 21 or the like previously and is about 2 seconds.

Namely, the ECM 21 judges whether the elapsed time after the starting is not more than 2 seconds or not at the process of the step S20.

At the process of the step S20, when the elapsed time after starting the engine 20 is judged to be within the range of predetermined time, the process is shifted to a step S30. On the other hand, when the elapsed time is judged not to be within the range, the process is shifted to a step S22.

When the process is shifted to the step S30, the engine 20 is immediately after the starting and is idled, whereby the engine rotation speed is between M1 and MC in FIG. 6.

In this case, the control range of the rack position becomes wider by selecting the rotation speed rack position limit curve RM compared with the rack position limit curve RT. Accordingly, the ECM 21 selects the rotation speed rack position limit curve RM as the upper limit line determining the rack position at which the fuel injection amount becomes the maximum (S30).

Namely, the ECM 21 also functions as an example of a curve selection means selecting one of the rack position limit curve RT and the rotation speed rack position limit curve RM which makes the control range of the rack position wider.

Figure 8:
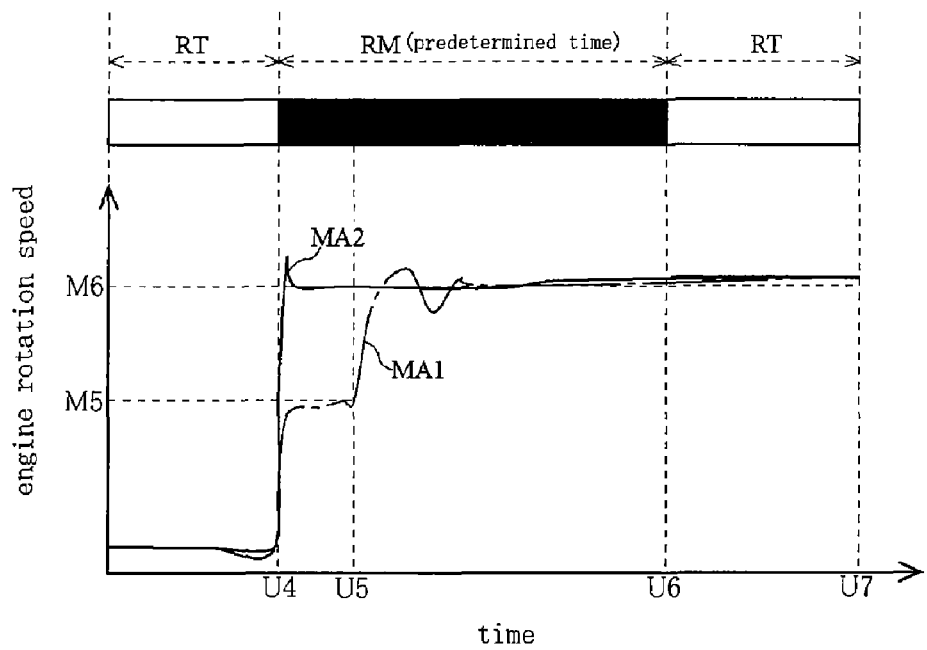
FIG. 8 is a diagram of an example of change of relation between time and engine rotation speed at the time of starting engine.

Here, explanation will be given on an example of change of relation between time and engine rotation speed in the case that the process is shifted from the step S20 to the step S30 according to FIG. 8.

In addition, time U4, conventional engine rotation speed curve MM and processed engine rotation speed curve MA2 shown in FIG. 8 have below means.

The time U4 is the time at which the engine 20 is started.

The conventional engine rotation speed curve MA1 shows a temporal change of the engine rotation speed in the case of selecting the curve which makes the control range of the rack position narrower conventionally.

The processed engine rotation speed curve MA2 shows a temporal change of the engine rotation speed in the case that the process from the step S20 to the step S30 is performed and the curve which makes the control range of the rack position wider is selected.

In this case, just after the engine 20 has been started at the time U4, the processed engine rotation speed curve MA2 is larger than the conventional engine rotation speed curve MA1.

Namely, though the conventional engine rotation speed curve MA1 remains near engine rotation speed M5 until time U5, the processed engine rotation speed curve MA2 reaches engine rotation speed M6 larger than the engine rotation speed M5 just after the time U4 and indicates enough output.

The range of predetermined time of the step S20 is between the time U4 and time U6 for example, and the rotation speed rack position limit curve RM is selected as the upper limit line within the range.

Accordingly, by performing the process from the step S20 to the step S30, the rotation speed rack position limit curve RM which makes the control range of the rack position wider is selected within the range of a predetermined time from the starting of the engine 20, whereby fuel injection amount is increased pertinently so as to prevent engine failure.

<Not More than Predetermined Rotation Speed>

When the process is shifted to the step S22, the ECM 21 judges whether the rotation speed of the engine 20 falls for not less than the predetermined rotation speed from the target rotation speed (S22).

The predetermined rotation speed has been memorized in the ECM 21 or the like previously and is about 50 revolutions.

At the process of the step S22, when the rotation speed of the engine 20 is judged to fall for not less than the predetermined rotation speed from the target rotation speed, the process is shifted to a step S30. On the other hand, when the rotation speed is judged not to fall, the process is shifted to a step S40.

Here, explanation will be given on an example of a change of the relation between time and engine rotation speed in the case that the process is shifted from the step S22 to the step S30 and engine rotation speed falls according to FIG. 9.

In addition, time U8, conventional engine rotation speed curve MA3 and processed engine rotation speed curve MA4 shown in FIG. 9 have below means.

The time U8 is the time at which rotation speed of the engine 20 becomes lower than the target rotation speed.

The conventional engine rotation speed curve MA3 shows a temporal change of the engine rotation speed in the case of selecting the curve which makes the control range of the rack position narrower conventionally.

The processed engine rotation speed curve MA4 shows a temporal change of the engine rotation speed in the case that the process from the step S22 to the step S30 is performed and the curve which makes the control range of the rack position wider is selected.

Figure 9:
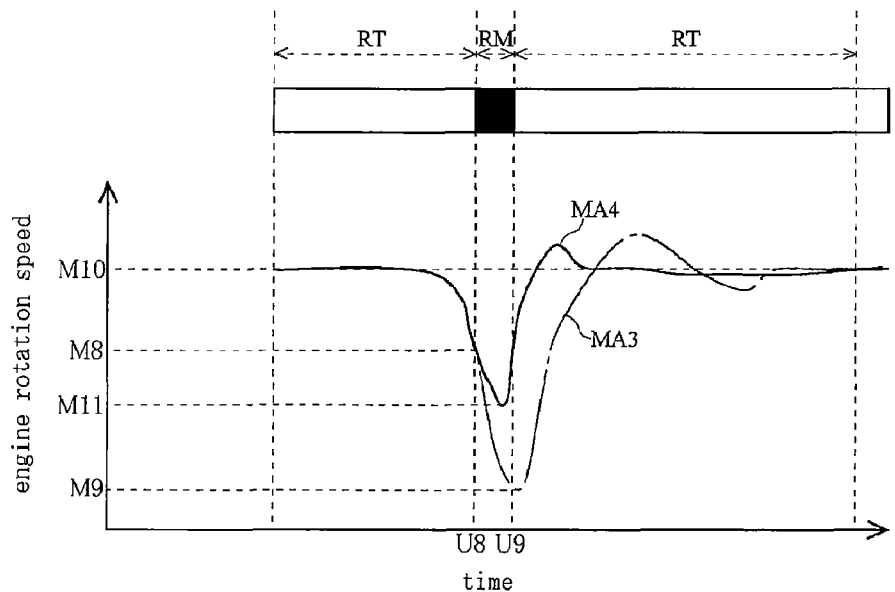
FIG. 9 is a diagram of an example of change of relation between time and engine rotation speed at the time that the engine rotation speed falls.

As shown in FIG. 9, when the engine rotation speed becomes lower than the target rotation speed M10, the processed engine rotation speed curve MA4 is higher than the conventional engine rotation speed curve MA3 and also returns to the target rotation speed M10 sooner.

Namely, though the conventional engine rotation speed curve MA3 reaches engine rotation speed M9 widely lower than the target rotation speed M10 at time U9, the processed engine rotation speed curve MA4 turns at engine rotation speed M11 higher than the engine rotation speed M9 before the time U9 and returns to the target rotation speed M10.

The range of predetermined rotation speed of the step S22 is between the target rotation speed M10 and engine rotation speed M8 for example, and the rotation speed rack position limit curve RM is selected as the upper limit line while the engine rotation speed is less than the engine rotation speed M8.

Accordingly, by performing the process from the step S22 to the step S30, the rotation speed rack position limit curve RM which makes the control range of the rack position wider is selected when the rotation speed of the engine 20 falls for not less than the predetermined rotation speed from the target rotation speed, whereby fuel injection amount is increased pertinently so as to prevent engine failure.

<Normal Control>

When the process is shifted to the step S40, normal control which has been used conventionally is preformed.

Namely, the ECM 21 controls so that one of the intake rack position limit curve RT and the rotation speed rack position limit curve RM which makes the control range of the rack position narrower is selected as the rack position at which fuel injection amount becomes the maximum (upper limit line).

<Control of Fuel Injection Amount>

With regard to the fuel injection system 1 constructed as mentioned above, the fuel injection amount of the fuel injection pump 40, that is, the position of the rack 28 in the governor 30 in this embodiment (hereinafter, simply referred to as "rack position") is adjusted based on the rotation speed of the engine 20 (hereinafter, simply referred to as "engine rotation speed") and the intake pressure of the supercharger. Namely, driving of the rack 28, whose position is adjusted so as to adjust the fuel injection amount, is controlled corresponding to the engine rotation speed and the intake pressure of the supercharger, and the relation beyond them has been memorized in the ECM 21 which is an example of the memory means previously.

Figure 10:
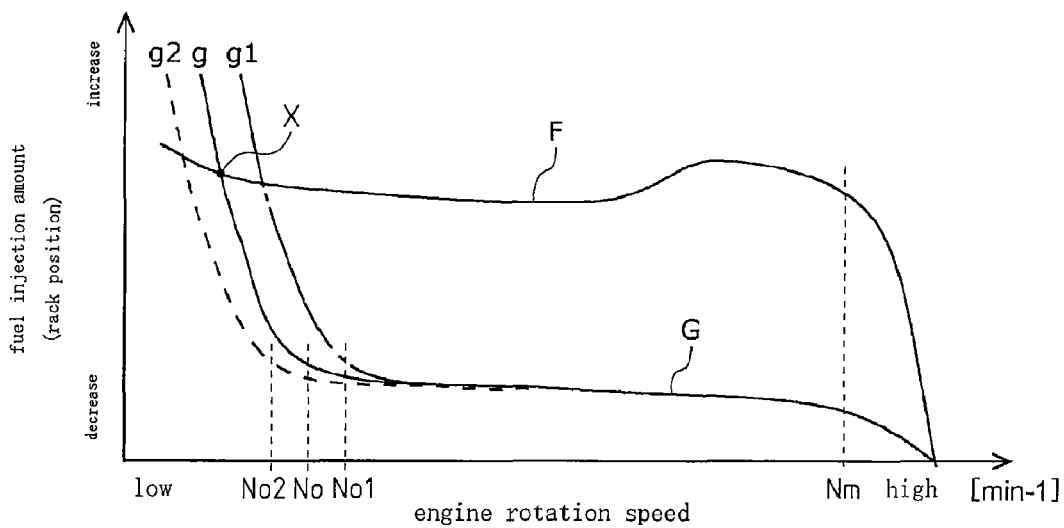
FIG. 10 is a diagram of relation between engine rotation speed and fuel injection amount.

The relation between engine rotation speed and fuel injection amount (rack position) is concretely shown in a graph in FIG. 10. Namely, with regard to the fuel injection system 1 according to the present invention, the fuel injection amount against the engine rotation speed is controlled based on a maximum fuel injection amount characteristic curve F (hereinafter, simply referred to as "maximum characteristic curve F") determining the relation between engine rotation speed and maximum fuel injection amount and a minimum fuel injection amount characteristic curve G (hereinafter, simply referred to as "minimum characteristic curve G") determining the relation between engine rotation speed and minimum fuel injection amount.

Then, based on a lower rotation speed side fuel injection amount characteristic curve (hereinafter, simply referred to as "lower rotation speed side characteristic curve") g which determines the relation between engine rotation speed and fuel injection amount and increases fuel injection amount following decrease of engine rotation speed at the side of lower rotation speed than minimum set rotation speed No whose setting can be changed, the ECM 21 controls fuel injection amount of the fuel injection pump at the side of lower rotation speed than the minimum set rotation speed No.

The maximum characteristic curve F shows the maximum fuel injection amount calculated based on each engine rotation speed with regard to the relation between engine rotation speed and fuel injection amount, and is an upper limit line of the fuel injection amount so to speak.

The minimum characteristic curve G shows minimum fuel injection amount calculated based on each engine rotation speed with regard to the relation between engine rotation speed and fuel injection amount, and is a lower limit line of the fuel injection amount so to speak.

The minimum set rotation speed No is the minimum engine rotation speed within the range of rotation speed adjustable by operating the main throttle 12 or the like, and is the engine rotation speed at the normal idling and has been set by the ECM 21 previously. In addition, in the graph in FIG. 10, a sign Nm indicates the maximum set rotation speed. The maximum set rotation speed Nm is maximum engine rotation speed within the range of rotation speed adjustable by operating the main throttle 12 or the like and has been set by the ECM 21 previously.

As was previously mentioned, when the engine rotation speed is lower than the minimum set rotation speed No, the ECM 21 controls the fuel injection amount based on the lower rotation speed side characteristic curve g. The lower rotation speed side characteristic curve g shows a part of the lower rotation speed side of the minimum characteristic curve G, and shows the fuel injection amount characteristic increasing the fuel injection amount following a decrease of the engine rotation speed when engine rotation speed is lower than the minimum set rotation speed No.

As shown in FIG. 10, the lower rotation speed side characteristic curve g has an intersection point X at which the curve g intersects the maximum characteristic curve F concerning engine rotation speed lower than the minimum set rotation speed No. At the side lower than the intersection point X, the fuel injection amount is increased higher than the value determined by the maximum characteristic curve F.

Namely, the ECM 21 fundamentally controls the fuel injection amount by adjusting rack position corresponding to load or the like within the range between the maximum characteristic curve F and the minimum characteristic curve G including the lower rotation speed side characteristic curve g. At the lower side of engine rotation speed, the ECM 21 performs the control conforming to the lower rotation speed side characteristic curve g so as to increase fuel injection amount following decrease of engine rotation speed. In this case, at the side lower than certain engine rotation speed at the side lower than the minimum set rotation speed No (the engine rotation speed at the intersection point X), fuel injection amount is increased along the lower rotation speed side characteristic curve g.

Accordingly, with regard to the fuel injection system 1 according to the present invention, the fuel injection amount is increased following a decrease of the engine rotation speed at the side lower than the minimum set rotation speed No set previously so as to improve engine failure-proof ability. Namely, when engine rotation speed is decreased at the time of applying load such as engaging the clutch while driving at the minimum set rotation speed No such as idling, the fuel injection amount is increased following a decrease of the engine rotation speed so as to prevent engine failure.

<Set of Minimum Set Rotation Speed>

For the purpose to improve the flexibility of the engine 20 and to prevent noise caused by resonance, the fuel injection system 1 is constructed so that the minimum set rotation speed No can be changed. Namely, by changing the minimum set rotation speed No, the engine rotation speed at the time of idling can be changed so as to deal with driving state desired by an operator. By enabling to change the minimum set rotation speed No at the time of idling, the resonance caused by the idling of the ship can be prevented, whereby noise caused by the resonance accompanied by the driving of the engine 20.

The minimum set rotation speed No is fundamentally set at the time of delivery of the fuel injection system 1. However, an operator can change the minimum set rotation speed No with an operating panel provided in the operation part 10 or the like. Concretely, for example, the minimum set rotation speed No can be changed within a range from 700 to 800 [rpm] for every 20 [rpm].

With regard to the fuel injection system 1 constructed that the minimum set rotation speed No can be changed, the ECM 21 as a control means increases and decreases engine rotation speed, which corresponds to the fuel injection amount of the lower rotation speed side characteristic curve g, following increase and decrease of the minimum set rotation speed No by the change.

Namely, when the minimum set rotation speed is changed toward the higher rotation speed side so as to be increased from No to No 1 for example, the ECM 21 increases corresponding engine rotation speed of the lower rotation speed side characteristic curve g following the increase of the minimum set rotation speed. In this case, on the graph in FIG. 10, the lower rotation speed side characteristic curve g of the minimum characteristic curve G is moved substantially horizontally toward the higher rotation speed side (the right side) (see g1). To the contrary, when the minimum set rotation speed is changed toward the lower rotation speed side so as to be decreased from No to No2, the ECM 21 decreases the corresponding engine rotation speed of the lower rotation speed side characteristic curve g following the decrease of the minimum set rotation speed. In this case, on said graph, the lower rotation speed side characteristic curve g of the minimum characteristic curve G is moved substantially horizontally toward the lower rotation speed side (the left side) (see g2).

Here, when the minimum set rotation speed No is increased or decreased by the above-mentioned change of setting, the engine rotation speed corresponding to fuel injection amount of the lower rotation speed side characteristic curve g is increased or decreased following the increase or decrease of the minimum set rotation speed No. However, the engine rotation speed corresponding to the fuel injection amount of the lower rotation speed side characteristic curve g is not always increased or decreased and the fuel injection amount characteristic may be changed following the minimum set rotation speed No. Namely, the lower rotation speed side characteristic curve g is not always moved substantially horizontally on the graph while keeping its shape and the shape of the curve may be changed following the change of the minimum set rotation speed No. Otherwise, it may alternatively be constructed that plural lower rotation speed side characteristic curves g, corresponding to respective minimum set rotation speeds No settable within the predetermined range of engine rotation speed, have been memorized in the ECM 21 previously, and fuel injection amount is controlled based on the lower rotation speed side characteristic curve g corresponding to the minimum set rotation speed No set by an operator or the like.

Engine rotation speed corresponding to the fuel injection amount of the lower rotation speed side characteristic curve g is increased or decreased following the change of the minimum set rotation speed No, thereby maintaining engine failure-proof ability and preventing a fall of the operability and driving feeling and an increase of discharge of unburnt fuel accompanied by the change of the minimum set rotation speed No.

Namely, in the case that the minimum set rotation speed No is increased, when load is applied at the time of idling or the like, the fuel injection amount is increased pertinently following fall of engine rotation speed. Accordingly, the amount of fall of engine rotation speed is prevented from increasing so as to prevent fall of operability and driving feeling. In the case that the minimum set rotation speed No is decreased, excessive fuel injection is prevented at the time of idling or the like, whereby increase of discharge of unburnt fuel is prevented.

<Effect of Control>

Figure 11:
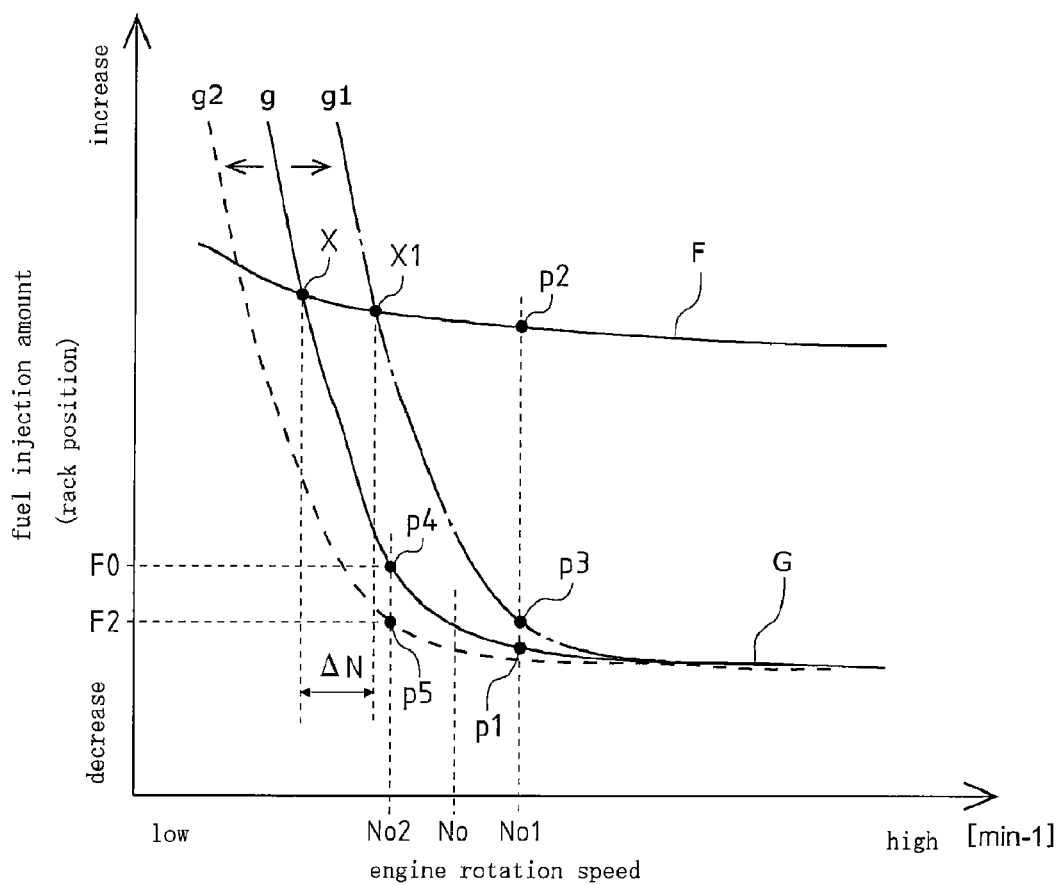
FIG. 11 is a drawing of the same expanded partially.

According to a partially expanded graph in FIG. 11, a concrete embodiment of change of engine rotation speed and fuel injection amount will be shown and the above-mentioned effect is explained. Herein, the minimum set rotation speed before changed is referred to as No and the lower rotation speed side characteristic curve corresponding to the minimum set rotation speed No is referred to as g.

First of all, explanation will be given on the case that the minimum set rotation speed No is increased to No1.

First, it is supposed that the engine rotation speed corresponding to the fuel injection amount of the lower rotation speed side characteristic curve g is not increased (the lower rotation speed side characteristic curve g is not moved) though the minimum set rotation speed is increased from No to No1 and idling drive is performed while the engine rotation speed is the minimum set rotation speed No1. Namely, on the graph, this state corresponds to a point p1 at which engine rotation speed on the lower rotation speed side characteristic curve g is No1. In this state, when load is applied on the engine 20 by engaging the clutch or the like, the fuel injection amount is increased to the maximum corresponding to the engine rotation speed at this state (No1). Namely, on the graph, the state is moved from the point p1 to a point p2 on the maximum characteristic curve F. Since the engine rotation speed is decreased by the applied load, the state is moved from the point p2 toward the lower rotation side along the maximum characteristic curve F.

Then, when the engine rotation speed falls to a certain value, the fuel injection amount is increased based on the lower rotation speed side characteristic curve g at the lower rotation side than the certain value. Namely, on the graph, when the state reaches from the point p2 to the intersection point X of the maximum characteristic curve F and the lower rotation speed side characteristic curve g, fuel injection amount is increased based on the lower rotation speed side characteristic curve g at the lower rotation side than the engine rotation speed at the intersection point X. Subsequently, when the load is canceled, the engine rotation speed is increased and returns to the minimum set rotation speed No1, whereby the state corresponds to the point p1.

Namely, supposing that the engine rotation speed corresponding to the fuel injection amount of the lower rotation speed side characteristic curve g is not increased (the lower rotation speed side characteristic curve g is not moved) though the minimum set rotation speed is increased from No to No1, when the engine rotation speed falls at the time of idling, the engine rotation speed falls from No1 to the engine rotation speed at the intersection point X until fuel injection amount exceeds the injection amount based on the maximum characteristic curve F and increased based on the lower rotation speed side characteristic curve g.

On the other hand, according to the present invention, it is supposed that engine rotation speed corresponding to the fuel injection amount of the lower rotation speed side characteristic curve g is increased following increase of the minimum set rotation speed from No to No1 and idling drive is performed while engine rotation speed is the minimum set rotation speed No1. Namely, by increasing the minimum set rotation speed from No to No1, the lower rotation speed side characteristic curve g is moved to g1, and the state corresponds to a point p3 at which engine rotation speed on the lower rotation speed side characteristic curve g1 after moved is No1. From this state, when a load is applied on the engine 20 by engaging the clutch or the like, the fuel injection amount is increased similarly to the above-mentioned case and the state is moved from the point p3 to the point p2 on the maximum characteristic curve F. Subsequently, the engine rotation speed falls by the applied load and the state is moved from the point p2 toward the lower rotation side along the maximum characteristic curve F.

Then, when the engine rotation speed falls to a certain value, the fuel injection amount is increased based on the lower rotation speed side characteristic curve g1 at the lower rotation side than the certain value. Namely, on the graph, when the state reaches from the point p2 to a intersection point X1 of the maximum characteristic curve F and the lower rotation speed side characteristic curve g1, the fuel injection amount is increased based on the lower rotation speed side characteristic curve g1 at the lower rotation side than the engine rotation speed at the intersection point X1. Subsequently, when the load is canceled, the engine rotation speed is increased and returns to the minimum set rotation speed No1, whereby the state corresponds to the point p3.

Namely, since the lower rotation speed side characteristic curve g is moved to g1 by increasing the minimum set rotation speed from No to No1, the engine rotation speed corresponding to the fuel injection amount of the lower rotation speed side characteristic curve g is increased and moved to the lower rotation speed side characteristic curve g1. Accordingly, when the engine rotation speed falls at the time of idling, the engine rotation speed falls from No1 to the engine rotation speed at the intersection point X1 until fuel injection amount exceeds the injection amount based on the maximum characteristic curve F and increased based on the lower rotation speed side characteristic curve g1.

Comparing these cases with each other, when the engine rotation speed falls by applying a load at the time of idling at the minimum set rotation speed No1 after changed, the engine rotation speed falls from No1 to the engine rotation speed at the intersection point X until fuel injection amount is increased based on the lower rotation speed side characteristic curve g (or g1). However, the lower rotation speed side characteristic curve g is moved to g1 so that the fall of engine rotation speed is suppressed to the engine rotation speed at the intersection point X1. Namely, the amount of fall of the engine rotation speed is reduced for a remainder $\Delta N$ of the engine rotation speed at the intersection point X and the engine rotation speed at the intersection point X1. In other words, the fall of engine rotation speed by applying load is recovered faster for the remainder $\Delta N$. Accordingly, fall of operability and driving feeling by applying load at the time of idling is prevented.

Next, explanation will be given on the case that the minimum set rotation speed No is decreased to No2.

In this case, it is supposed that the engine rotation speed corresponding to the fuel injection amount of the lower rotation speed side characteristic curve g is not increased (the lower rotation speed side characteristic curve g is not moved) though the minimum set rotation speed is increased from No to No2. Then, a point p4, at which the engine rotation speed on the lower rotation speed side characteristic curve g is No2, corresponds to the idling while engine rotation speed is the minimum set rotation speed No2. Fuel injection amount at this state is referred to as F0.

On the other hand, according to the present invention, it is supposed that the engine rotation speed corresponding to the fuel injection amount of the lower rotation speed side characteristic curve g is increased following decrease of the minimum set rotation speed from No to No2 so that the lower rotation speed side characteristic curve g is moved to g2. Then, a point p5, at which the engine rotation speed on the lower rotation speed side characteristic curve g2 is No2, corresponds to the idling while engine rotation speed is the minimum set rotation speed No2. The fuel injection amount at this state is referred to as F2.

Namely, comparing these cases with each other, the engine rotation speed corresponding to the fuel injection amount of the lower rotation speed side characteristic curve g falls following decrease of the minimum set rotation speed No, and the lower rotation speed side characteristic curve g is moved to g2, whereby fuel injection amount at the minimum set rotation speed No2 after changed is decreased from F0 to F2. Accordingly, excessive fuel injection is prevented, whereby an increase of discharge of unburnt fuel is prevented.

INDUSTRIAL APPLICABILITY

The present invention is applicable to a fuel injection system of a diesel engine widely so as to improve start ability of the engine, to prevent engine failure and to prevent a fall of operability and driving feeling and an increase of discharge of unburnt fuel accompanied by a change of minimum set rotation speed.

The invention claimed is:

1. A fuel injection system comprising:
a control means controlling timing of fuel injection to a cylinder of an engine,
wherein, when the engine is required to stop, the control means advances the timing of fuel injection so as to increase an actual phase difference between the timing of fuel injection and rotation of a crankshaft of the engine, compares the actual phase difference with a target phase difference predetermined for engine stopping, and stops the fuel injection after the control means judges that the increased actual phase difference has reached the target phase difference.

2. The fuel injection system as set forth in claim 1, wherein the timing of fuel injection is changed by a timer piston.

3. The fuel injection system as set forth in claim 1, wherein the control means stops fuel injection without advancing the timing of fuel injection in a case of stopping the engine emergently.

4. A fuel injection system comprising:
a rack which adjusts fuel injection amount of a fuel injection pump injecting fuel to an engine; and
a control means configured to control the rack based on either (1) an intake rack position limit curve determining relation between intake pressure of a supercharger and a rack position maximizing fuel injection amount or (2) a rotation speed rack position limit curve determining relation between engine rotation speed and the rack position maximizing fuel injection amount, wherein the control means has a curve selection means selecting one of the intake rack position limit curve and the rotation speed rack position limit curve which makes the control range of the rack position wider when engine rotation speed falls for not less than predetermined rotation speed from target rotation speed.

5. A fuel injection system comprising:

a rack which adjusts fuel injection amount of a fuel injection pump injecting fuel to an engine; and a control means configured to control the rack based on either (1) an intake rack position limit curve determining relation between intake pressure of a supercharger and a rack position maximizing fuel injection amount or (2) a rotation speed rack position limit curve determining relation between engine rotation speed and the rack position maximizing fuel injection amount, wherein the control means has a curve selection means selecting one of the intake rack position limit curve and the rotation rack position limit curve which makes the control range of the rack position wider when elapsed time from starting the engine is within a predetermined range.

6. A fuel injection system comprising a control means controlling fuel injection amount of a fuel injection pump based on a lower rotation speed side fuel injection amount characteristic curve which determines relation between engine rotation speed and fuel injection amount so that fuel injection amount is increased following fall of engine rotation speed at slower rotation side than changeable minimum set rotation speed, wherein the control means increases and decreases engine rotation speed so as to correspond to fuel injection amount of the lower rotation speed side fuel injection amount characteristic curve following increase and decrease of the minimum set rotation speed.

* * * * *